United States Patent [19]

Shinohara et al.

[11] Patent Number: 5,431,090
[45] Date of Patent: Jul. 11, 1995

[54] VALVE MEMBER HOLDING STRUCTURE IN A VACUUM BOOSTER

[75] Inventors: Takayoshi Shinohara; Toshiyuki Suwa, both of Ueda, Japan

[73] Assignee: Nissin Kogyo Company, Limited, Nagano, Japan

[21] Appl. No.: 102,382

[22] Filed: Aug. 5, 1993

[30] Foreign Application Priority Data

Jan. 26, 1993 [JP] Japan .................. 5-011143
Jan. 26, 1993 [JP] Japan .................. 5-011144

[51] Int. Cl.$^6$ ............................................. F01B 29/00
[52] U.S. Cl. .................. 92/128; 91/376 R; 403/13; 403/329
[58] Field of Search .............. 91/376 R, 369.1, 369.2, 91/369.3, 369.4; 92/128; 403/13, 14, 326, 329

[56] References Cited

U.S. PATENT DOCUMENTS

| | | |
|---|---|---|
| 367,578 | 8/1887 | Babb .................. 403/14 |
| 3,832,075 | 8/1974 | Arai .................. 403/329 |
| 5,178,055 | 1/1993 | Shinohara et al. . |
| 5,214,995 | 6/1993 | Gautier .................. 91/376 R |

FOREIGN PATENT DOCUMENTS

| | | |
|---|---|---|
| 0076753A1 | 4/1983 | European Pat. Off. . |
| 0221791A1 | 5/1987 | European Pat. Off. . |
| 0318681A1 | 6/1989 | European Pat. Off. . |
| 0462849A1 | 12/1991 | European Pat. Off. . |
| 197455 | 10/1985 | Japan .................. 91/376 R |
| 173459 | 5/1989 | Japan . |
| 412852 | 3/1992 | Japan . |
| 2204967 | 1/1980 | United Kingdom ....... 91/376 R |

Primary Examiner—F. Daniel Lopez
Attorney, Agent, or Firm—Whitham, Curtis, Whitham & McGinn

[57] ABSTRACT

In a vacuum booster in which a holding tube is fitted in a cylindrical valve case, and the base end portion of a valve member is fitted in an annular holding groove formed in the outer surface of the front end portion of the holding tube in such a manner as to be sealingly engaged with the inner surface of the cylindrical valve case, the inner surface of the cylindrical valve case is gradually larger in diameter towards the open rear end thereof, while the outer surface of the holding tube is tapered towards the rear end thereof, and guiding grooves and arcuate engaging grooves are formed in the inner surface of the cylindrical valve case in such a manner that each guiding groove is axially extended a predetermined distance from the open end of the cylindrical valve case, and each engaging groove is extended circumferentially of the cylindrical valve case, while guiding pawls and engaging pawls are formed on the outer surface of the holding tube in such a manner that the guiding pawls are slidably engaged with the guiding grooves abutting against the ends of the guiding grooves, and the engaging pawls are resiliently engaged with the engaging groove when the guiding pawls abut against the ends of the engaging grooves.

17 Claims, 3 Drawing Sheets

VALVE MEMBER HOLDING STRUCTURE IN A VACUUM BOOSTER

BACKGROUND OF THE INVENTION

The present invention relates to a vacuum booster for operating a brake master cylinder in an automobile, motorcycle or the like in a boost mode, and more particularly to an improvement of a vacuum booster in which a holding tube which holds a valve member of a control valve is fitted in a synthetic resin cylindrical valve case with the front end portion coupled to a booster piston and with the rear end opened, and the base end portion of a valve member is fitted in an annular holding groove formed on the outer surface of the front end portion of the holding tube in such a manner that the base end portion is sealingly engaged with the inner surface of the cylindrical valve case. Further, the present invention relates to a holding tube mounting structure in the vacuum booster with which the holding tube is secured to the cylindrical valve case.

In a conventional vacuum booster, as shown, for instance, in Unexamined Japanese Utility Model Publication (OPI) No. 73459/1989, the holding tube is secured to the cylindrical valve case as follows. The front end of the holding tube is abutted against an annular step formed on the inner surface of the cylindrical valve case. Under this condition, the rear end of the holding tube is held with a circlip which is engaged with an annular engaging groove formed on the inner surface of the cylindrical valve case.

The holding tube is combined with the cylindrical valve case in the above-described manner. Hence, when the holding tube is inserted into the cylindrical valve case under the condition that the base end portion of the valve member is held in the holding groove, the base end portion of the valve member is damaged by the annular step formed on the inner surface of the cylindrical valve case. Therefore, the holding tube and the cylindrical valve case must be assembled carefully. Since the annular engaging groove on the inner surface of the cylindrical valve case is difficult to form with the metal mold, the annular engaging groove is formed by machining. This fact increases the manufacturing cost of the vacuum booster together with the fact that it is necessary to use the circlip to hold the rear end of the holding tube.

In another conventional vacuum booster, as disclosed, for instance, in Examined Japanese Utility Model Publication No. 12852/1992, in order to fix a holding tube inserted into a cylindrical valve case, a circlip retaining a rear end of the holding tube is engaged with an annular groove formed in an inner surface of the cylindrical valve case. That is, the holding tube cannot be fixed without the circlip. In order to engage the circlip with the annular groove, a special tool must be used, which makes it rather difficult to assemble the holding tube and the cylindrical valve case with high efficiency.

SUMMARY OF THE INVENTION

The present invention has been made in view of the above circumstances involved in conventional apparatuses.

An object of the present invention is to provide a valve member holding structure for a vacuum booster, which, being simple in arrangement, allows a holding tube to be readily secured to a cylindrical valve case without formation of an annular step in an inner surface of the cylindrical valve case or without use of a special retaining part such as a circlip.

The object of the present invention has been achieved by the provision of the valve member holding structure for the negative booster in which the holding tube is fitted in the synthetic resin cylindrical valve case with the front end portion coupled to a booster piston and with the rear end opened, and the base end portion of a valve member is fitted in an annular holding groove formed in the outer surface of the front end portion of the holding tube in such a manner that the base end portion is sealingly engaged with the inner surface of the cylindrical valve case; in which, according to the present invention, the inner surface of the cylindrical valve case is gradually larger in diameter from a predetermined portion thereof, which is brought into close contact with the base end portion of the valve member, towards the open rear end thereof, the outer surface of the holding tube is tapered towards the rear end thereof, which is engaged with the inner surface of the cylindrical valve case, a plurality of arcuate engaging grooves are formed in the inner surface of the cylindrical valve case in such a manner that the engaging grooves are extended circumferentially of the latter, and a plurality of engaging pawls, which are resiliently engaged with the engaging grooves, are formed in the outer surface of the holding tube.

Further, the object of the present invention has been achieved by the provision of a holding tube mounting structure for a vacuum booster, in which the cylindrical valve case is coupled to a booster piston, and the holding tube holding the valve member of a control valve is fitted in the cylindrical valve case; in which, according to the present invention, a guiding groove and an arcuate engaging groove are formed in the inner surface of the cylindrical valve case in such a manner that the guiding groove is axially extended a predetermined distance from the open end of the cylindrical valve case, and the engaging groove is extended circumferentially of the cylindrical valve case, and a guiding pawl and an engaging pawl are formed on the outer surface of the holding tube in such a manner that the guiding pawl is slidably engaged with the guiding groove abutting against the end portion of the guiding groove, and the engaging pawl is resiliently engaged with the engaging groove when the guiding pawl abuts against the end portion of the engaging groove.

In the structure, the guiding pawl and the engaging pawl are axially offset from each other so that, when the holding tube is inserted into the cylindrical valve case, the guiding pawl enters the cylindrical valve case prior to the engaging pawl.

The nature, utility and principle of the present invention will be more clearly understood from the following detailed description and the appended claims when read in conjunction with the accompanying drawings.

DETAILED DESCRIPTION OF THE PREFERRED EMBODIMENTS

Preferred embodiments of the present invention will be described with reference to the accompanying drawings.

Figure 1:
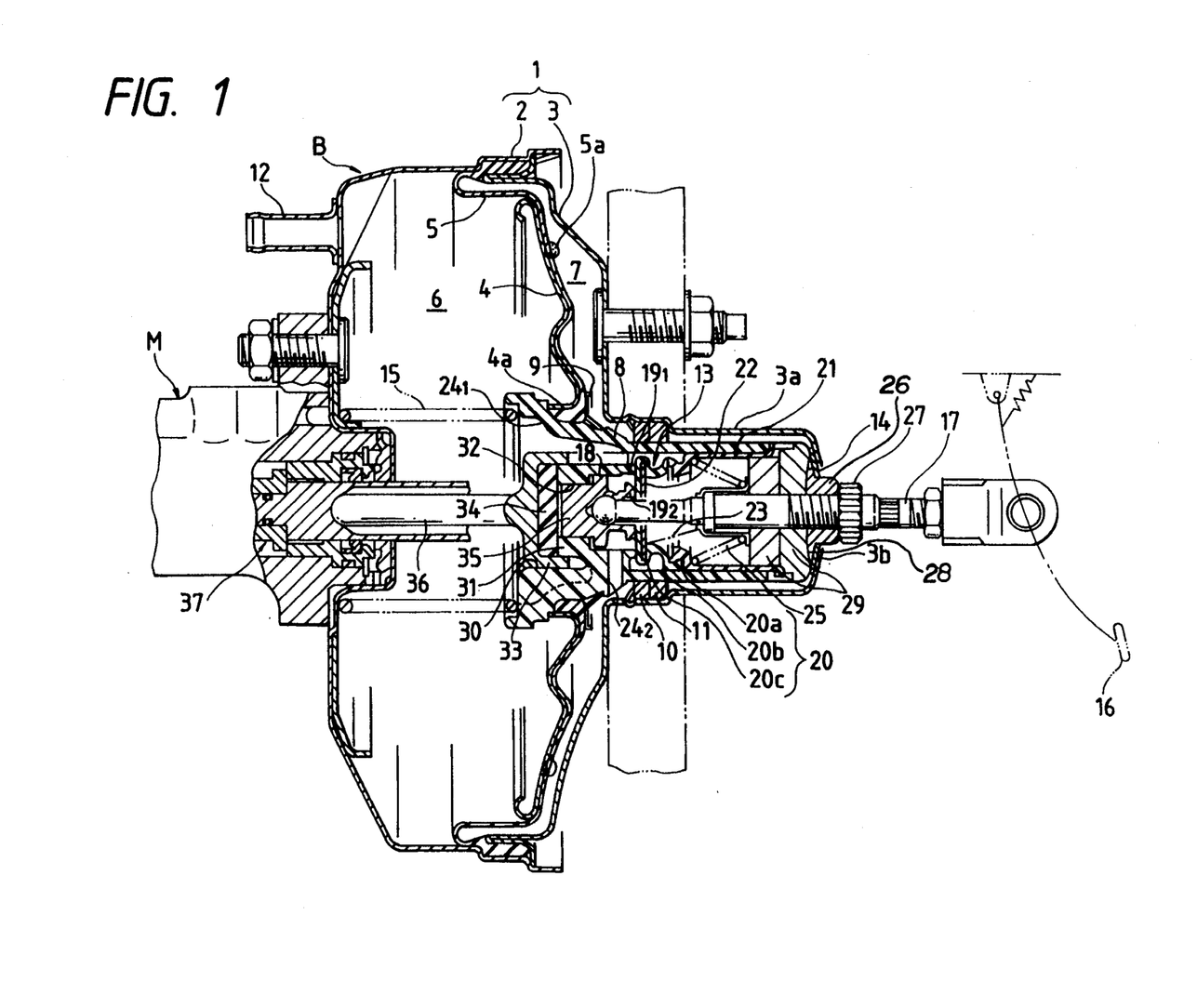
FIG. 1 is a longitudinal sectional view showing a vacuum booster, which constitutes one embodiment of the present invention.

As shown in FIG. 1, in a vacuum booster B, a brake master cylinder M, which is operated by the booster B, is mounted on a front wall of a booster shell 1.

The booster shell 1 is made up of a front shell half 2 and a rear shell half 3 which are combined with each other. A booster piston 4 made of a steel plate which is movable back and forth, and a diaphragm 5 secured to the rear surface of the booster piston 4 are provided in the booster shell 1, and divide the inside of the booster shell 1 into a front chamber and a rear chamber, namely, a front vacuum chamber 6 and a rear working chamber 7. The diaphragm 5 has outer and inner peripheral beads. The outer peripheral bead of the diaphragm is held between the shell halves 2 and 3, and the inner peripheral bead together with the central boss 4a of the booster piston 4 is mounted on the outer surface of a cylindrical valve case 8, and secured with a stopper 9. That is, the cylindrical valve case 8 is extended backwardly through the central boss 4a of the booster piston 4, and slidably supported through a bush 10 and a sealing member 11 by a rearwardly extended tube 3a which merges with the rear wall of the rear shell half 3.

The front vacuum chamber 6 is communicated with a vacuum source, namely, the suction manifold (not shown) of the internal combustion engine through a vacuum pressure introducing pipe 12 at all times. The rear working chamber 7 is alternately communicated with the vacuum chamber and an atmospheric air inlet opening 14 in the end portion of the rearwardly extended tube 3a by a control valve 13 provided in the cylindrical valve case 8.

The booster piston 4 is kept urged backwardly, i.e., towards the rear working chamber 7, by a return spring 15 set compressed in the front vacuum chamber 6. The backward movement of the booster piston 4 is limited as follows: That is, the booster piston 4 is allowed to move backwardly until a number of projections 5a circularly arranged on the rear surface of the diaphragm 5 abut against the inner surface of the rear wall of the booster shell 1.

Figure 2:
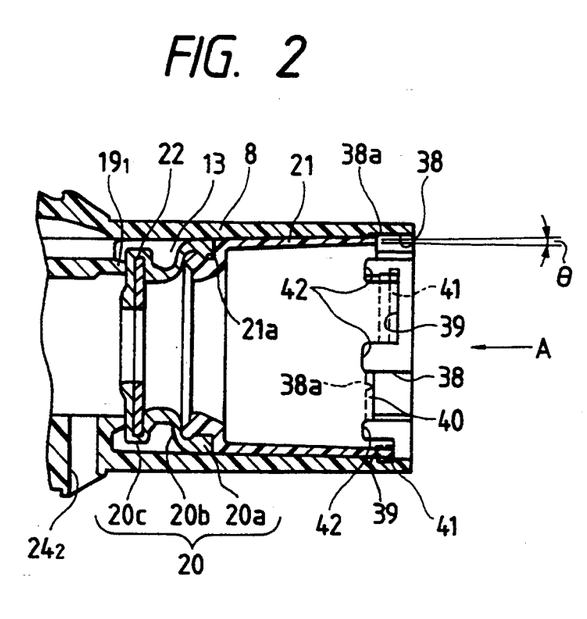
FIG. 2 is an enlarged sectional view showing a cylindrical valve case and a holding tube in the vacuum booster of FIG. 1.

An input rod 17 coupled to a brake pedal 16, and the control valve 13 operated by the input rod 17 are provided in the valve piston 18 as follows: A valve piston 18 is slidably fitted in the front end portion of the cylindrical valve case 8. The input rod 17 is extended through the above-described atmospheric air inlet opening 14, and the front end of the input rod 17 is loosely engaged with the valve piston 18. A first annular valve seat $19_1$ is formed on the inner surface of the cylindrical valve case 8, and a second annular valve seat $19_2$, which is also an annular valve seat, is formed on the rear end surface of the valve piston 18. A valve member 20 cooperating with those annular valve seats $19_1$ and $19_2$ is provided in the cylindrical valve case 8 as shown in FIG. 2. The valve member 20 is made of rubber, and is shaped in the form of a hollow cylinder. The rear end portion of the valve member 20, namely, a bead-shaped base end 20a is fitted in an annular holding groove 21a, which is formed on the outer surface of the front end portion of a holding tube 21 fitted in the cylindrical valve case 8, in such a manner that the base end 20a is in close contact with the inner surface of the cylindrical valve case 8. A structure for mounting the holding tube 21 will be described later.

The valve member 20 provides a flexible portion 20b relatively small in wall thickness which is extended from the base end 20a in such a manner that it is inwardly bent in a radial direction, and a valve portion 20c relatively large in wall thickness which is extended forwardly from the flexible portion 20b. The valve portion 20c is confronted with the aforementioned first and second annular valve seats $19_1$ and $19_2$. The valve portion 20c is moved back and forth as the flexible portion 20b deforms. When the valve portion 20c is moved forwardly, the valve portion 20c is seated on the first and second annular valve seats $19_1$ and $19_2$, and when the valve portion 20c is moved backwardly, the valve portion 20c is stopped abutting against the front end of the holding tube 21.

An annular reinforcement member 22 is buried in the valve portion 20c. A valve spring 23 is provided between the reinforcement member 22 and the input rod 17, to urge the valve portion 20c towards the first and second annular valve seats $19_1$ and $19_2$.

Inside the cylindrical valve case 8, a first passage $24_1$ communicated with the front vacuum chamber 6 is opened on the outside of the first annular valve seat $19_1$, and a second passage $24_2$ communicated with the rear working chamber 7 is opened on the inside of the first annular valve seat $19_1$. The inside of the second annular valve seat $19_2$ is communicated with the atmospheric air inlet opening 14 through the valve member 20 and the holding tube 21.

The valve member 20, the valve spring 23, and the first and second annular valve seats $19_1$ and $19_2$ form the aforementioned control valve 13.

A return spring 25 is set compressed between the input rod 17 and the holding tube 21, to urge the input rod 17 backwardly. The limit of backward displacement of the input rod 17 is determined by a stopper plate 26 which abuts against the inner surface of the end wall 3b of the rearwardly extended tube 3a. The stopper plate 26 is threadingly engaged with the input rod 17, and therefore the position of the stopper plate 26 can be adjusted by turning the stopper plate 26; that is, the limit of backward displacement of the input rod 17 can be determined. The stopper plate 26 adjusted in position is fixed by tightening a lock nut 27 threadingly mounted on the input rod 17. The stopper plate 26 has a vent hole 28 so that it may not block the atmospheric air inlet opening 14.

Inside the cylindrical valve case 8, air filters 29 are mounted on the input rod 17 in such a manner that the air filters embrace the input rod 17. The air filters 29 are to filter the air which is to be introduced into the cylindrical valve case 8. The air filters 29 are flexible so that they do not interfere with the relative displacement of the input rod 17 and the cylindrical valve case 8.

The cylindrical valve case 8 has a bottomed hole, namely, a large diameter cylinder bore 30 which is opened forwardly, a cylindrical projection 31 extended from the bottom of the large diameter cylinder bore 30, and a small diameter cylinder bore 32 penetrating the cylindrical projection 31. A cup-shaped output piston 33 is slidably fitted in the large diameter cylinder bore 30. The above-described cylindrical projection 31 is slidably fitted in the output piston 33 with a resilient member 34 made of rubber or the like and serving as a cushion in the output piston 33. A reaction piston 35, which is protruded from the front end surface of the valve piston 18, is slidably fitted in the small diameter cylinder bore 32.

An output rod 36 is protruded from the front end surface of the output piston 33, and coupled to the working piston 37 of the brake master cylinder M.

Figure 3:
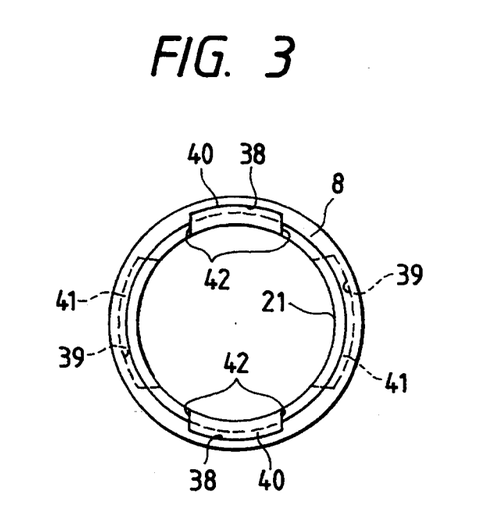
FIG. 3 is a side view showing the cylindrical valve case and the holding tube as viewed in the direction of the arrow "A" in FIG. 2.
Figure 4:
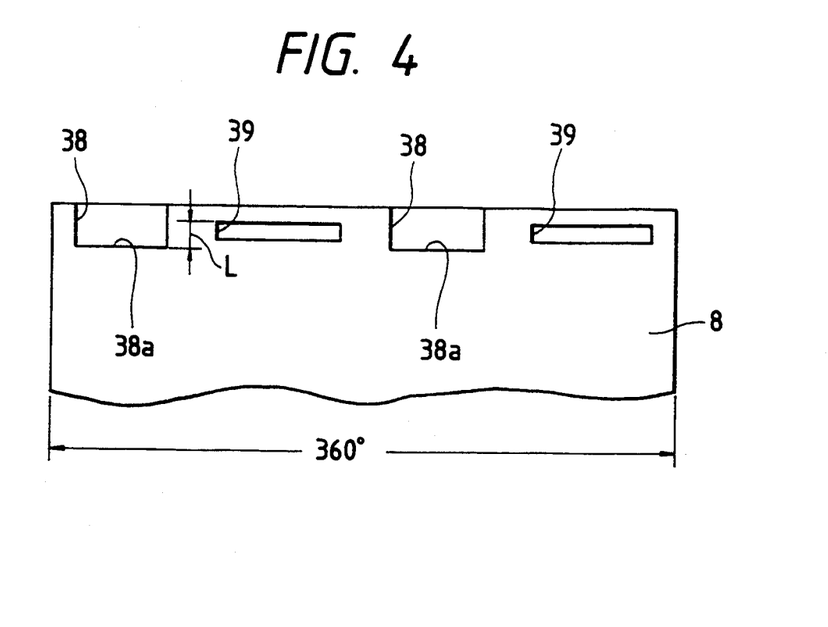
FIG. 4 is an unfolding diagram of the cylindrical valve case, showing an inner surface thereof.
Figure 5:
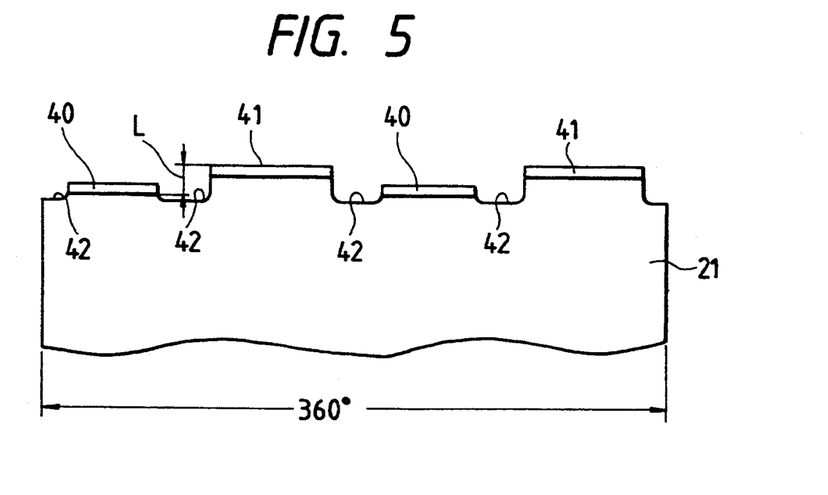
FIG. 5 is also an unfolding diagram of the holding tube, showing an outer surface thereof.

Mounting the holding tube 21 on the cylindrical valve case 8 will be described with reference to FIGS. 2 through 5. FIG. 2 is an enlarged diagram of the valve member and a part of the valve member holding cylinder shown in FIG. 1. FIG. 3 is a side view of the valve member and the holding tube as viewed in the direction of the arrow "A" in FIG. 2. FIG. 4 is an unfolding diagram of the inner surface of the cylindrical valve case 8. FIG. 5 is an unfolding diagram of the outer surface of the holding tube 21.

The cylindrical valve case 8 and the holding tube 21 are formed by molding a thermoplastic or thermosetting synthetic resin. In the molding operation, as shown in FIGS. 2 through 4, a pair of guiding grooves 38 and a pair of engaging grooves 39 are formed on the inner surface of the cylindrical valve case 8 in such a manner that they are arranged alternately in a circumferential direction of the cylindrical valve case 8. Each of the guiding grooves 38 is axially extended a predetermined distance and depth from the rear end of the cylindrical valve case 8, and is arcuate in cross section. Each of the engaging grooves 39 has an axial groove width which is much shorter than the axial length of the guiding groove 38. The engaging grooves 39 are arcuate and extended circumferentially of the cylindrical valve case 8. Each of the engaging grooves 39 is positioned at the middle of the axial length of the guiding groove 38. That is, the engaging groove 39 is offset a predetermined distance L from the end portion 38a of the guiding groove 38 towards the rear end of the cylindrical valve case 8 as shown in FIG. 4.

Furthermore, as shown in FIGS. 2, 3 and 5, a pair of guiding pawls 40 and a pair of engaging pawls 41 are protruded from the rear end of the holding tube 21 in such a manner that those pawls 40 and 41 are arranged alternately in the circumferential direction of the holding tube 21. The guiding pawls 40 are slidably engaged with the above-described guiding grooves 38 to abut against the end portions 38a of the guiding grooves 38, respectively. On the other hand, the engaging pawls 41 are resiliently engaged with the engaging grooves 39 when the guiding pawls 40 abut against the end portions 38a of the guiding grooves 38, respectively. That is, the guiding pawls 40 are offset from the engaging pawls as much as a distance which is equal to the above-described predetermined distance L.

The holding tube 21 has arc-shaped recesses 42 between the guiding pawls 40 and the engaging pawls 41 to apply resiliency to the base portions of the engaging pawls 41.

As shown in FIG. 2, the inner surface of the cylindrical valve case 8, and the outer surface of the holding tube 21 are tapered so as to expand in diameter from a portion where they are in close contact with the base end 20a of the valve member 20 towards the open ends thereof (to the right in FIG. 2) defining an angle $\theta$.

The operation of the vacuum booster thus constructed will be described.

When the vacuum booster stops operating, as shown in FIG. 1, the input rod 17 is held at the setback end position, and the control valve 13 is in the neutral state; that is, the valve portion 20c of the valve member 20 is set on the first and second annular valve seats $19_1$ and $19_2$ so that the rear working chamber 7 is not communicated with the vacuum chamber and the atmospheric air inlet opening 14. As a result, the vacuum of the vacuum source is supplied through the vacuum pressure introducing pipe 12 into the front vacuum chamber 6, and held therein, while the vacuum is held in the rear working chamber 7 which has been suitably attenuated by the atmospheric pressure. Hence, the difference in pressure between the front vacuum chamber 6 and the rear working chamber 7 causes the booster piston 4 to slightly move forwardly. However, since this booster piston forwarding force is in balance with the elastic force of the return spring 15, the booster piston 4 is stopped slightly before the setback end position.

In the case where the brake pedal 16 is operated to brake the vehicle, the input rod 17 and the valve piston 18 are moved forwardly. In this case, since initially the booster piston 4 is not operated, immediately the second annular valve seat $19_2$ is disengaged from the valve portion 20c to communicate the rear working chamber 7 with the atmospheric air inlet opening 14. Therefore, the air is applied through the atmospheric air inlet opening 14, the second annular valve seat $19_2$ and the second passage $24_2$ into the rear working chamber 7, so that the pressure in the operating chamber 7 is changed into the atmospheric pressure. As a result, the difference in air pressure between the front vacuum chamber 6 and the rear working chamber 7 produces a forward force to move the booster piston 4 forwardly against the elastic force of the return spring 15, so that the working piston 37 of the brake master cylinder M is driven forwardly to brake the vehicle.

During the vehicle braking operation, the valve piston 18 together with the input rod 17 is moved forwardly to abut against the resilient member 34 through the reaction piston 35. In this case, the resilient member 34 receives the reaction of the output rod 36 through the output piston 33, so that the resilient member 34 is deformed expanding towards the small diameter cylinder bore 32, thus causing part of the reaction to act on the reaction piston 35. Therefore, the force is fed back to the brake pedal 16 through the valve piston 18 and the input rod 17, so that the driver can sense the output of the output rod 36; that is, the magnitude of the braking force.

When the brake pedal 16 is released, the input rod 17 together with the valve piston 18 is moved backwardly by the elastic force of the return spring 25, so that the second annular valve seat $19_2$ is engaged with the valve portion 20c while the valve portion 20c is greatly moved away from the first annular valve seat $19_1$. Therefore, the rear working chamber 7 is communicated with the front vacuum chamber 6 through the first and second passages $24_1$ and $24_2$; that is, the difference in air pressure between the two chambers is eliminated. As a result, the booster piston 4 is moved backwardly by the elastic force of the return spring 15, so that the brake master cylinder M is released. When the input rod 17 is returned to the setback end position where the stopper plate 26 is abutted against the end wall 3b of the rearwardly extended tube 3a, the booster piston 4 is returned to the setback end position where the projections 5a of the diaphragm 5 are abutted against the rear wall of the booster shell 1, so that the first annular valve seat $19_1$ is engaged with the valve portion 20c while the cylindrical valve case 8 is slightly disengaged from the second annular valve seat $19_2$. As a result, the air is introduced into the rear working chamber 7 through the second passage $24_2$. However, this air introduction causes a difference in air pressure between the two chambers, to slightly move the booster piston 4 forwardly. Therefore, the small gap between the second annular valve seat $19_2$ and the valve portion 20c is eliminated, so that the control valve 13 is placed in the neutral state again. As a result, the vacuum attenuated by the atmospheric pressure is held in the rear working chamber 7, and the vacuum booster B is held at rest as shown in FIG. 1.

With the vacuum booster B as described above, the cylindrical valve case 8 is combined with the holding tube 21 as follows.

First, the base end 20a of the valve member 20 is engaged with the holding grooves 21a of the holding tube 21, and then the holding tube 21 is inserted into the cylindrical valve case 8 from behind while the valve member 20 is engaged at the head of the holding tube 21. During this operation, the guiding pawls 40 enter the cylindrical valve case 8 prior to the engaging pawls 41, and then the guiding pawls 40 are engaged with the guiding grooves 38. Under this condition, when the holding tube 21 is further inserted into the cylindrical valve case 8, the engaging pawls 41 are bent inwardly by the inner cylindrical wall of the cylindrical valve case 8 momentarily. Thereafter, when the guiding pawls 40 abut against the end portions 38a of the guiding grooves 38, the engaging pawls 41 are automatically engaged with the engaging grooves 39.

The engagement of the engaging pawls 41 with the engaging grooves 39 prevents the holding tube 21 from disengaging from the cylindrical valve case 8. The engagement of the guiding pawls 40 with the guiding grooves 38 serves to guide the engagement of the engaging pawls 41 with the engaging grooves 39, and further serves to prevent the engaging pawls 41 from going beyond the engaging grooves.

As described above, the inner surface of the cylindrical valve case 8, and the outer surface of the holding tube 21 fitted in the cylindrical valve case 8 are tapered defining the angle $\theta$. Therefore, even if the holding tube 21 is inserted into the cylindrical valve case 8 carelessly, the base end 20a of the valve member 20 is accurately set in place on the cylindrical valve case 8 while being guided by the tapered inner surface of the cylindrical valve case 8. As a result, during the inserting operation, the base end 20a of the valve member 20 is not damaged at all, and the valve member 20 and the cylindrical valve case 8 are sealingly engaged with each other. Further, since the valve member 20 and the holding tube 21 do not strongly rub against the tapered inner surface of the cylindrical valve case 8 until they are fixedly set in place in the cylindrical valve case 8, the holding tube 21 can be inserted into the cylindrical valve case 8 with ease.

The engaging grooves 39 of the cylindrical valve case 8 are not annular but arcuate. Therefore, the engaging grooves 39 can be readily formed simultaneously with the operation that the cylindrical valve case 8 is formed by molding. This fact, in combination with the structure that the engaging pawls 41 engaged with the engaging grooves 39 are formed unitedly with the holding tube 21, reduces the manufacturing cost of the vacuum booster as much.

While there has been described in connection with the preferred embodiment of the present invention, it will be obvious to those skilled in the art that various changes and modifications may be made therein without departing from the present invention. For instance, in the case where the engaging pawls 41 and the engaging grooves 39 are positioned by the use of an assembling tool, the guiding pawls 40 and the guiding grooves 38 can be eliminated.

The engaging surfaces of the cylindrical valve case 8 and the holding tube 21 are tapered as described above. Therefore, while the holding tube 21 is being inserted into the cylindrical valve case 8, there is formed a clearance therebetween which allows the holding tube 21 to be smoothly inserted into the cylindrical valve case 8.

Further, according to the present invention, since the cylindrical valve case 8 and the holding tube 21 are formed by molding a thermoplastic or thermosetting synthetic resin, the angle $\theta$, which is defined by the tapered surfaces of the cylindrical valve case 8 and the holding tube 21, can freely be selected in accordance with a demand on design.

Moreover, as shown in FIGS. 4 and 5, the engaging pawls 41 and the engaging grooves 39, and the guiding pawls 40 and the guiding grooves 38 are rectangularly formed. However, as far as the object of the present invention is not deteriorated, these components may be formed with the other shapes, e.g., trapezoidal, notched, semicircular, or the like.

As described above, in the vacuum booster of the present invention, the inner surface of the cylindrical valve case is gradually larger in diameter from the predetermined portion, which is brought into close contact with the base end portion of the valve member, towards the open rear end thereof, the outer surface of the holding tube is tapered towards the rear end thereof which is engaged with the inner surface of the cylindrical valve case, and a plurality of arcuate engaging grooves are formed in the inner surface of the cylindrical valve case, while a plurality of engaging pawls, which are resiliently engaged with the engaging grooves, are formed in the outer surface of the holding tube. Hence, even if the holding tube is inserted into the cylindrical valve case carelessly, the valve member is accurately set in place in the cylindrical valve case, being guided by the tapered inner surface of the latter. Hence, in the inserting operation, the valve member is not damaged at all, and the valve member and the holding tube will not strongly rub the inner surface of the cylindrical valve case until they are fixedly set in place in the cylindrical valve case, which allows the easy insertion of them into the cylindrical valve case. Thus, the vacuum booster can be assembled with high efficiency.

The engaging grooves of the cylindrical valve case are arcuate, and not annular. Therefore, the engaging grooves can be readily formed when the cylindrical valve case is formed by molding. In addition, the fact that the engaging pawls engaged with the engaging grooves are formed unitedly with the holding tube 21, dispenses with the provision of a special retaining part, and reduces the manufacturing cost of the vacuum booster as much.

Furthermore, in the vacuum booster of the present invention, the guiding grooves and the arcuate engaging grooves are formed in the inner surface of the cylindrical valve case in such a manner that each guiding groove is axially extended a predetermined distance from the open end of the cylindrical valve case, and each engaging groove is extended circumferentially of the cylindrical valve case, and the guiding pawls and the engaging pawls are formed on the outer surface of the holding tube in such a manner that the guiding pawls are slidably engaged with the guiding grooves abutting against the end portions thereof, and the engaging pawls are resiliently engaged with the engaging grooves when the guiding pawls abut against the end portions of the guiding grooves. Hence, the holding tube can be fixedly held in the cylindrical valve case without circlips, merely by fitting the holding tube into the cylindrical valve case. In this operation, the engaging pawls can be readily engaged with the engaging grooves with the aid of the guiding pawls and the guiding grooves. Since each guiding pawl abuts against the end portion of the respective guiding groove, it is prevented from going beyond the respective engaging groove. This structure makes it possible to assemble the vacuum booster with ease.

Furthermore, in the vacuum booster, the guiding pawls and the engaging pawls are axially offset from each other so that, when the holding tube is inserted into the cylindrical valve case, the guiding pawls enter the cylindrical valve case prior to the engaging pawls. In other words, in inserting the holding tube into the cylindrical valve case, first the guiding pawls are engaged with the guiding grooves, thus guiding the engaging pawls positively to positively engage the engaging grooves. This structure allows the vacuum booster to be assembled with high efficiency.

What is claimed is:

1. A valve member holding structure in a vacuum booster, comprising:
    a booster piston;
    a cylindrical valve case coupled to said booster piston at a front end, and having a rear end opened;
    a valve member fitted in said cylindrical valve case;
    a holding tube fixedly fitted to an inner surface of said cylindrical valve case, said holding tube comprising an annular holding groove formed in an outer surface of a front end portion thereof for sealingly engaging a base end of said valve member with said inner surface of said cylindrical valve case;
    a plurality of arcuate engaging grooves formed on said inner surface of said cylindrical valve case, and extending circumferentially therearound so as not to be accessible from an outer surface of said cylindrical valve case; and
    a plurality of engaging pawls projectingly and integrally formed on said outer surface of said holding tube, said holding tube further including an elongated portion coupled between said holding groove and said plurality of engaging pawls, said elongated portion being in close contact with said inner surface of said cylindrical valve case, each of said engaging pawls resiliently engaging respective ones of said engaging grooves completely within said cylindrical valve case,
    wherein said inner surface of said cylindrical valve case includes a tapered surface formed substantially along an entire length of said inner surface so as to be gradually larger in diameter towards said rear end from a portion where said inner surface engages with said base end of said valve member, and
    said outer surface of said holding tube includes a tapered surface formed substantially along an entire length of said outer surface of said holding tube for engaging said tapered surface of said inner surface of said cylindrical valve case.

2. A valve member holding structure according to claim 1, wherein said inner surface of said cylindrical valve case and said outer surface of said holding tube are tapered to define a predetermined angle.

3. A valve member holding structure according to claim 1, further comprising a plurality of guiding grooves formed on said inner surface of said cylindrical valve case, and axially extending by a predetermined distance from said rear end of said cylindrical valve case.

4. A valve member holding structure in a vacuum booster, comprising:
    a valve case having an opening at a rear end thereof;
    a holding tube fitted to an inner surface of said valve case;
    a valve member sealingly engaging with said inner surface of said valve case through said holding tube; and
    means for engaging an outer surface of said holding tube with said inner surface of said valve case,
    said engaging means comprising a plurality of engaging grooves formed peripherally on said inner surface of said valve case so as not to be accessible from an outer surface of said valve case, and a plurality of engaging pawls formed projectingly and integrally on said outer surface of said holding tube, and each of said engaging pawls resiliently engaging respective ones of said engaging grooves completely within said valve case, said inner surface of said valve case being tapered substantially along an entire length thereof so as to be gradually larger in diameter towards a first end from a portion where said inner surface engages with an end of said valve member,
    said holding tube further including an annular holding groove formed at a first end of said holding tube for sealingly engaging said end of said valve member, and an elongated portion coupled between said holding groove and said plurality of engaging pawls, said elongated portion being tapered substantially along an entire length thereof and being in close contact with said tapered surface of said inner surface of said valve case.

5. A valve member holding structure according to claim 4, further comprising a plurality of guiding grooves formed on said inner surface of said cylindrical valve case, and axially extending by a predetermined distance from said rear end of said valve case.

6. The valve member holding structure of claim 4, wherein said inner surface of said valve case comprises a tapered surface formed so as to be gradually larger in diameter towards said rear end of said valve case from a portion where said inner surface of said valve case engages said valve member, and
    said outer surface of said holding tube comprises a tapered surface engaging said tapered surface of said inner surface of said valve case.

7. The valve member holding structure of claim 4, wherein each of said engaging grooves and said engaging pawls is rectangular in shape and each has a longer length along a circumferential direction of each of said valve case and said holding tube than along an axial direction of each of said valve case and said holding tube.

8. A valve member holding structure according to claim 4, wherein said engaging grooves of said cylindrical valve case have an arcuate shape.

9. A valve member holding structure according to claim 4, wherein said inner surface of said cylindrical valve case and said outer surface of said holding tube are tapered to define a predetermined angle.

10. A structure for combining a holding tube with a cylindrical valve case in a vacuum booster, comprising:
a booster piston coupling said cylindrical valve case;
control valve means fitted in said cylindrical valve case, and comprising a valve member held by said holding tube;
a plurality of guiding grooves formed on an inner surface of said cylindrical valve case, and axially extending by a predetermined distance from an open end of said cylindrical valve case;
a plurality of arcuate engaging grooves formed on said inner surface of said cylindrical valve case, and extending circumferentially;
a plurality of guiding pawls formed on said outer surface of said holding tube, and slidably engaging said guiding grooves so as to abut against end portions of said guiding grooves; and
a plurality of engaging pawls formed on said outer surface of said holding tube, each of said engaging pawls resiliently engaging respective ones of said engaging grooves when each of said guiding pawls abuts against each of said end portions of said guiding grooves.

11. The structure of claim 10, wherein said guiding pawls and said engaging pawls are axially offset from each other so that said guiding pawls enter said cylindrical valve case prior to said engaging pawls when said holding tube is inserted into said cylindrical valve case.

12. A valve member holding structure, comprising:
a booster piston;
a cylindrical valve case coupled to said booster piston at a front end, and having a rear end opened;
a valve member fitted in said cylindrical valve case;
a holding tube fixedly fitted to an inner surface of said cylindrical valve case, said holding tube comprising an annular holding groove formed in an outer surface of a front end portion thereof for sealingly engaging a base end of said valve member with said inner surface of said cylindrical valve case;
a plurality of arcuate engaging grooves formed on said inner surface Of said cylindrical valve case, and extending circumferentially therearound so as not to be accessible from an outer surface of said cylindrical valve case;
a plurality of engaging pawls projectingly and integrally formed on said outer surface of said holding tube, said holding tube further including an elongated portion coupled between said holding groove and said plurality of engaging pawls, said elongated portion being in close contact with said inner surface of said cylindrical valve case, each of said engaging pawls resiliently engaging respective ones of said engaging grooves completely within said cylindrical valve case; and
a plurality of guiding pawls formed on said outer surface of said holding tube and axially offset from said plurality of engaging pawls, respectively,
wherein said inner surface of said cylindrical valve case includes a tapered surface formed so as to be gradually larger in diameter towards said rear end from a portion where said inner surface engages with said base end of said valve member, and
said outer surface of said holding tube includes a tapered surface engaging said tapered surface of said inner surface of said cylindrical valve case.

13. A valve member holding structure, comprising:
a valve case having an opening at a rear end thereof;
a holding tube fitted to an inner surface of said valve case;
a valve member sealingly engaging with said inner surface of said valve case through said holding tube;
means for engaging an outer surface of said holding tube with said inner surface of said valve case,
said engaging means comprising a plurality of engaging grooves formed peripherally on said inner surface of said valve case so as not to be accessible from an outer surface of said valve case, and a plurality of engaging pawls formed projectingly and integrally on said outer surface of said holding tube, and each of said engaging pawls resiliently engaging respective ones of said engaging grooves completely within said valve case,
said holding tube further including an annular holding groove formed at a first end of said holding tube for sealingly engaging an end of said valve member, and an elongated portion coupled between said holding groove and said plurality of engaging pawls, said elongated portion being in close contact with said inner surface of said valve case,
said valve member holding structure further comprising a plurality of guiding pawls formed on said outer surface of said holding tube and axially offset from said plurality of engaging pawls, respectively.

14. A valve member holding structure in a vacuum booster, comprising:
a booster piston;
a cylindrical valve case coupled to said booster piston at a front end, and having a rear end opened;
a valve member fitted in said cylindrical valve case;
a holding tube fixedly fitted to an inner surface of said cylindrical valve case, said holding tube comprising an annular holding groove formed in an outer surface of a front end portion thereof for sealingly engaging a base end of said valve member with said inner surface of said cylindrical valve case;
a plurality of arcuate engaging grooves formed on said inner surface of said cylindrical valve case, and extending circumferentially therearound so as not to be accessible from an outer surface of said cylindrical valve case;
a plurality of engaging pawls projectingly formed on said outer surface of said holding tube, and each of said engaging pawls resiliently engaging respective ones of said engaging grooves completely within said cylindrical valve case;
a plurality of guiding grooves formed on said inner surface of said cylindrical valve case, and axially extending by a predetermined distance from said rear end of said cylindrical valve case; and
a plurality of guiding pawls formed on said outer surface of said holding tube, and slidably engaging said guiding grooves so as to abut against end portions of said guiding grooves,
wherein said inner surface of said cylindrical valve case includes a tapered surface formed so as to be gradually larger in diameter towards said rear end from a portion where said inner surface engages with said base end of said valve member, and said outer surface of said holding tube includes a tapered surface engaging said tapered surface of said inner surface of said cylindrical valve case.

15. A valve member holding structure according to claim 14, wherein said plurality of guiding pawls are axially offset from said plurality of engaging pawls, respectively.

16. A valve member holding structure in a vacuum booster, comprising:

a valve case having an opening at a rear end thereof;

a holding tube fitted to an inner surface of said valve case;

a valve member sealingly engaging with said inner surface of said valve case through said holding tube;

a plurality of guiding grooves formed on said inner surface of said cylindrical valve case, and axially extending by a predetermined distance from said rear end of said valve case;

means for engaging an outer surface of said holding tube with said inner surface of said valve case; and a plurality of guiding pawls formed on said outer surface of said holding tube, and slidably engaging said guiding grooves so as to abut against end portions of said guiding grooves, said engaging means comprising a plurality of engaging grooves formed peripherally on said inner surface of said valve case so as not to be accessible from an outer surface of said valve case, and a plurality of engaging pawls formed projectingly on said outer surface of said holding tube, each of said engaging pawls resiliently engaging respective ones of said engaging grooves completely within said valve case.

17. A valve member holding structure according to claim 16, wherein said plurality of guiding pawls are axially offset from said plurality of engaging pawls, respectively.

* * * * *